United States Patent
Okawada et al.

[19]

[11] Patent Number: 5,967,127
[45] Date of Patent: Oct. 19, 1999

[54] BLOW-BY GAS TREATMENT FOR ENGINE

[75] Inventors: Takayuki Okawada; Naoki Nozaki; Masahiro Kawamata, all of Saitama, Japan

[73] Assignee: Honda Giken Kogyo Kabushiki Kaisha Kaisha, Tokyo, Japan

[21] Appl. No.: 09/118,826

[22] Filed: Jul. 20, 1998

[30] Foreign Application Priority Data

Jul. 25, 1997  [JP]  Japan ................................. 9-200018

[51] Int. Cl.$^6$ .................... F02B 47/10; F02M 35/24; F01M 13/00; F01M 13/04
[52] U.S. Cl. ......................................................... 123/572
[58] Field of Search .................................. 123/572, 573, 123/305, 198 E

[56] References Cited

U.S. PATENT DOCUMENTS

| | | | |
|---|---|---|---|
| 3,705,497 | 12/1972 | Hollins | 123/572 |
| 3,769,798 | 11/1973 | Whittaker | 123/572 |
| 4,133,547 | 1/1979 | Fox | 180/54 A |
| 4,282,713 | 8/1981 | Antoku et al. | 60/600 |
| 4,503,931 | 3/1985 | Sugimoto et al. | 180/316 |
| 4,611,679 | 9/1986 | Yanagishita et al. | 180/68.3 |

FOREIGN PATENT DOCUMENTS 56-24257  6/1981  Japan .

*Primary Examiner*—Noah P. Kamen
*Assistant Examiner*—Jason Benton
*Attorney, Agent, or Firm*—Birch, Stewart, Kolasch & Birch, LLP

[57] ABSTRACT

To improve the low-temperature resistance of a blow-by gas treatment device. An air cleaner is connected through a carburetor to the intake side of a cylinder portion constituting an engine in a four-wheel buggy. A blow-by gas induction pipe is provided to connect a crankcase and one side surface of the air cleaner, so as to induce a blow-by gas from the crankcase to a return chamber defined in the air cleaner at one side portion thereof. An exhaust pipe extends rearwardly from the exhaust side of the cylinder portion along a part of the induction pipe, and is connected to a muffler. The muffler is located in the vicinity of the return chamber in the air cleaner, so as to warm the return chamber by the heat radiated from the muffler, thereby ensuring good returnability of the blow-by gas even at low temperatures. The exhaust pipe similarly warms the induction pipe.

12 Claims, 4 Drawing Sheets

BLOW-BY GAS TREATMENT FOR ENGINE

BACKGROUND OF THE INVENTION

1. Field of the Invention

The present invention relates to a blow-by gas treatment device which is excellent in low-temperature resistance for a riding type vehicle such as a four-wheel buggy.

2. Description of Background Art

A conventional blow-by gas treatment device is described in Japanese Utility Model Publication No. 5624257. This blow-by gas treatment device has a configuration such that a blow-by gas generated in a crankcase of an engine is induced through an induction pipe to a return chamber defined in an air cleaner to remove liquid components mixed in the blow-by gas in the return chamber, and the blow-by gas is next passed through a filter element provided in the air cleaner to be sucked into the engine.

In using an engine equipped with such a blow-by gas treatment device in low-temperature environments, there is a possibility that the return chamber and the induction pipe may be changed at low temperatures to cause a reduction in flowability of the blow-by gas therein. In particular, if a riding type vehicle may be expected to be used in harsh low-temperature environments it is desirable to be able to maintain good flowability of the blow-by gas, i.e., to ensure good returnability of the blow-by gas even at low temperatures.

SUMMARY AND OBJECTS OF THE INVENTION

According to the present invention, there is provided in a riding type vehicle having an engine, an air cleaner connected to an intake portion of said engine, an induction pipe for inducing a blow-by gas from said engine is to said air cleaner, and a muffler for receiving an exhaust gas from an exhaust portion of said engine. A blow-by gas treatment device for said engine provided wherein the air cleaner is provided in the vicinity of the muffler. A return chamber for receiving the blow-by gas induced by said induction pipe is defined in the air cleaner at a position disposed adjacent to or opposed to said muffler.

Because the air cleaner is provided in the vicinity of the muffler, and the return chamber is defined in the air cleaner at a position opposed to the muffler, the return chamber is warmed by the heat radiated from the muffler. Accordingly, a low-temperature change which might hinder the returnability of the blow-by gas in the return chamber can be prevented in low-temperature environments, thereby obtaining a blow-by gas treatment device excellent in low-temperature resistance. The present invention is especially effective for a riding type vehicle expected to be used in harsh low-temperature environments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
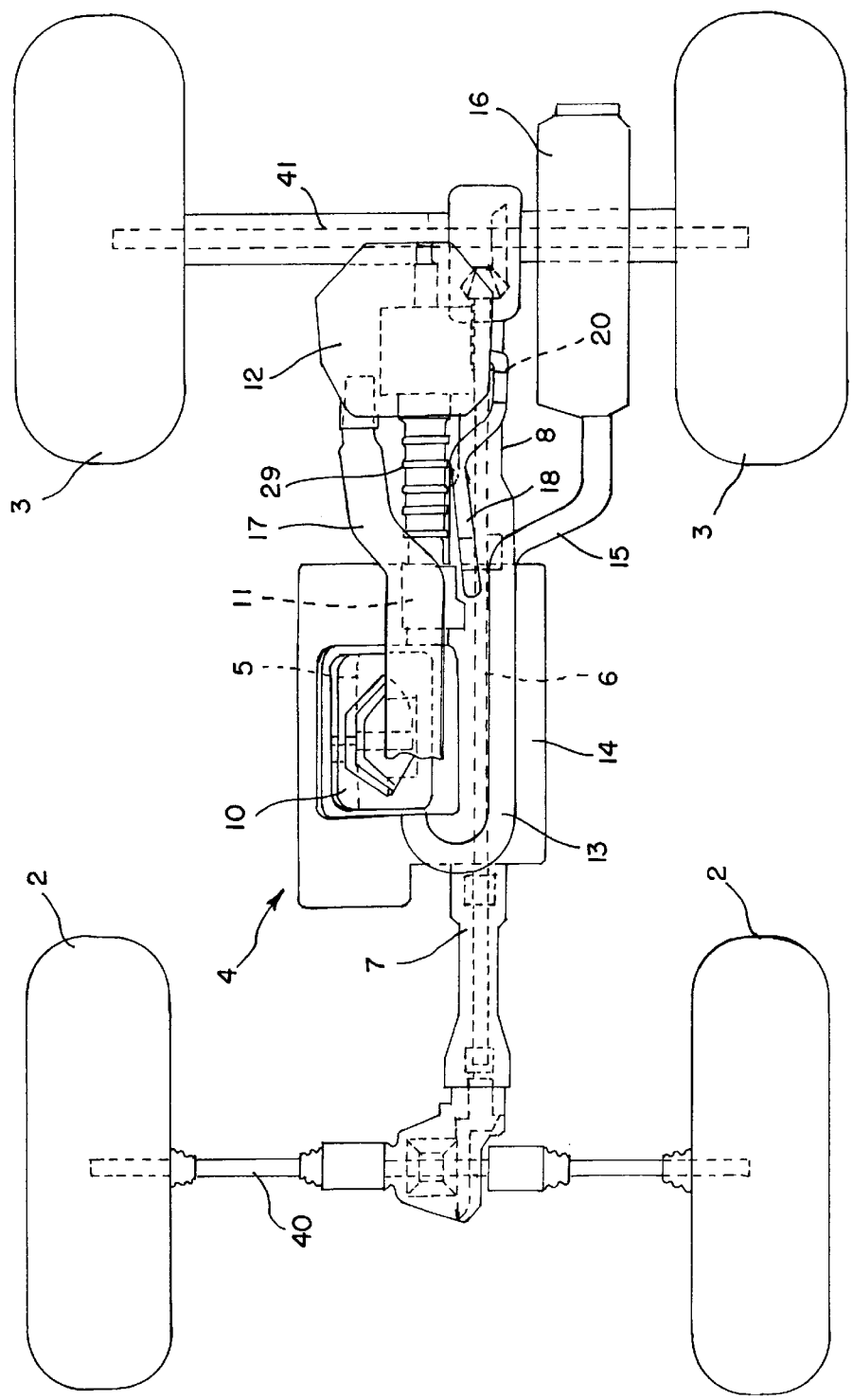
FIG. 1 is a schematic plan view mainly showing a power transmission system in a four-wheel drive buggy to which the present invention is applied.
Figure 2:
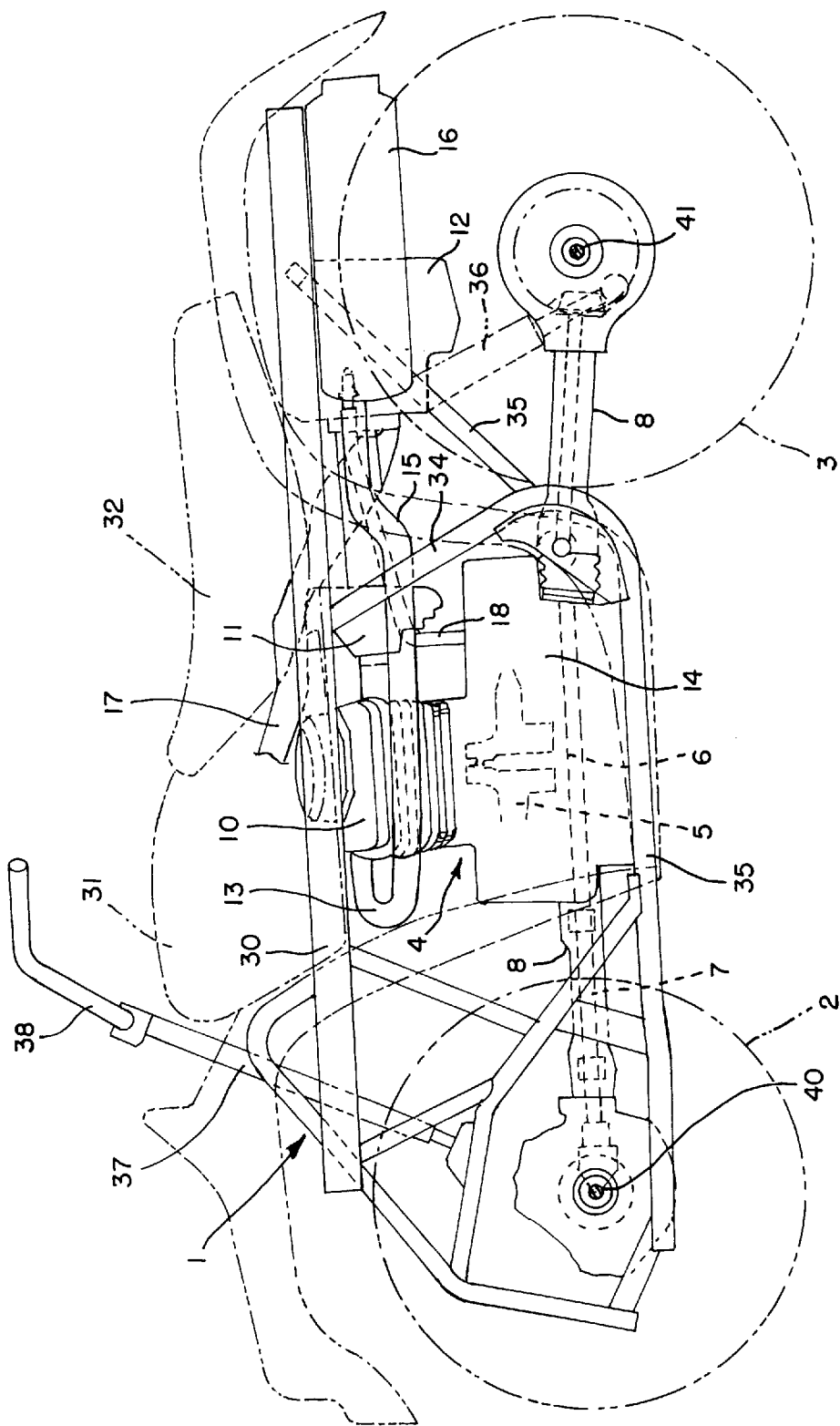
FIG. 2 is a side view of an essential part of the buggy.

As shown in FIGS. 1 and 2, the four-wheel drive buggy is a riding type four-wheel drive vehicle for running on a rough terrain. This vehicle includes a body frame 1, a pair of right and left front wheels 2 supported to a front portion of the body frame 1, a pair of right and left rear wheels 3 supported to a rear portion of the body frame 1, and an engine 4 mounted at a central portion of the body frame 1.

A crankshaft 5 of the engine 4 is arranged longitudinally of the body frame 1, and an output shaft 6 of the engine 4 is arranged in a parallel relationship to the crankshaft 5. Power from an engine is transmitted through a transmission mechanism (not shown) to the output shaft 6.

The output shaft 6 is connected at its opposite ends to a front propeller shaft 7 and a rear propeller shaft 8, thereby driving the front wheels 2 and the rear wheels 3 respectively through the front propeller shaft 7 and the rear propeller shaft 8.

A cylinder portion 10 of the engine 4 is laterally inclined to one side of the body (e.g., right side of the body). The cylinder portion 10 has a rear intake port connected through a carburetor 11 to an air cleaner 12, and has a front exhaust port connected to an exhaust pipe 13.

The exhaust pipe 13 extends frontwardly from the front exhaust port of the cylinder portion 10, next the exhaust size 13 is bent back, and next extends rearwardly along one side (e.g., left side) of the cylinder portion 10 and the upper side of a crankcase 14. The exhaust pipe 13 is further bent obliquely outwardly and upwardly to reach a muffler 16.

An intake pipe 17 is connected to the front end of the air cleaner 12. The intake pipe 17 extends obliquely upwardly from the air cleaner 12 to a position above the crankcase 14 on the left side of the cylinder portion 10. A blow-by gas induction pipe 18 is connected between the upper surface of the crankcase 14 at its rear portion and the left side surface of the air cleaner 12.

Figure 3:
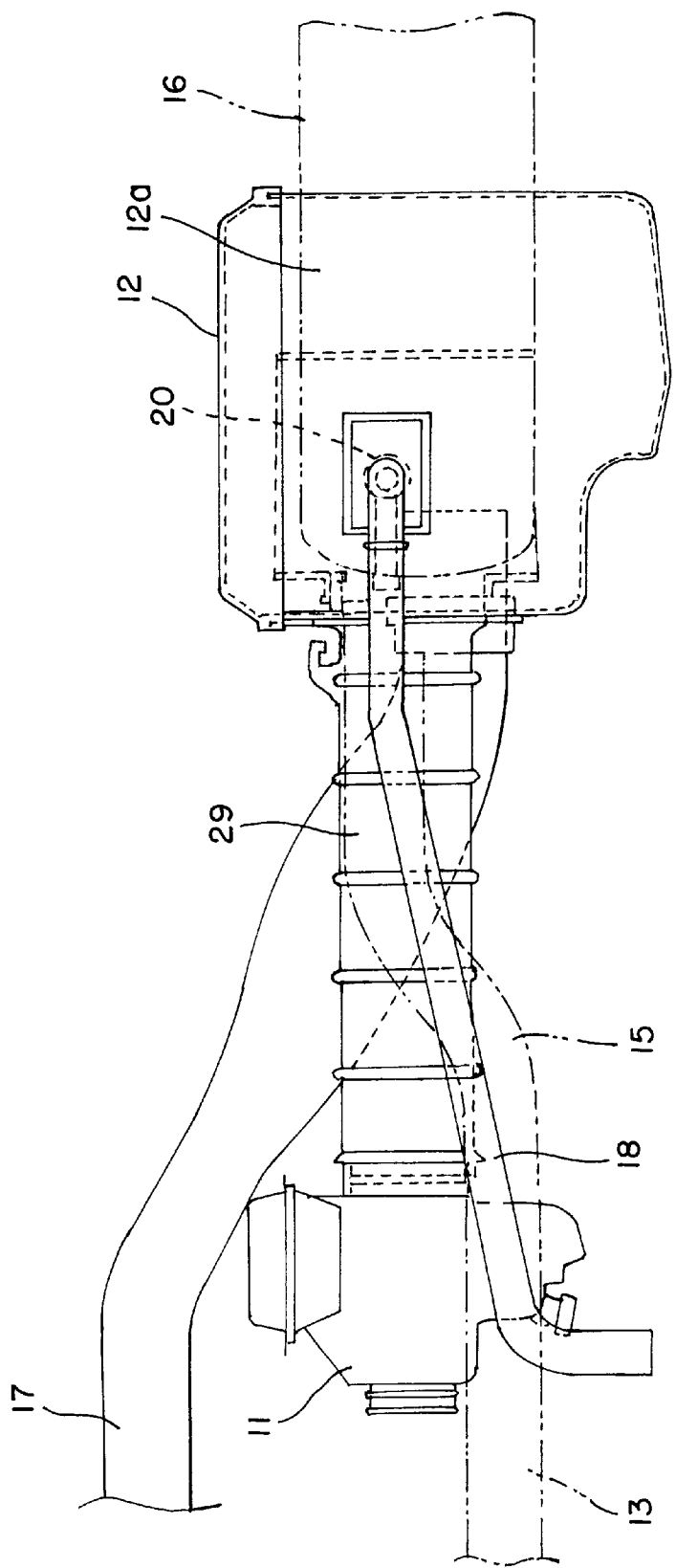
FIG. 3 is a side view of an air cleaner and its associated parts in the buggy.

The induction pipe 18 is a member for inducing a blow-by gas generated in the crankcase 14 to the air cleaner 12. As is apparent from FIG. 3, a rear end portion of the induction pipe 18 communicates with a return chamber 20 defined in the air cleaner 12 along its side wall 12a.

The blow-by gas is a mixture of unburnt gases and liquid components such as oil. A return chamber filter 21 formed of foamed polyurethane is provided in the return chamber 20 to remove water, oil, dust, etc. mixed in the blow-by gas. The return chamber 20 is defined by a case 22 having an open end projecting into a dirty area 23 in the air cleaner 12 and abutting against the outer circumferential surface of a cylindrical filter element 24 provided in the air cleaner 12.

The case 22 defining the return chamber 20 has a bottom portion 25 integrally formed with a pin like connecting portion 26 and a joint pipe 27. The connecting portion 26 is hermetically inserted through a small hole 12b formed through the side wall 12a of the air cleaner 12. The joint pipe 27 is also hermetically inserted through a joint hole 12c formed through the side wall 12a of the air cleaner 12. The joint pipe 27 projecting from the side wall 12a is bent to extend frontwardly and is connected to the rear end portion of the induction pipe 18. The joint pipe 27 is integrally formed with a flange 28 for hermetically sealing the joint hole 12c.

A clean area defined inside the filter element 24 is connected to one end portion of a connecting tube 29 extending through an air outlet 12d of the air cleaner 12 into the filter element 24. The other end portion of the connecting tube 29 is connected to an upstream portion of the carburetor 11.

An air inlet 12e of the air cleaner 12 to which the intake pipe 17 is connected is located on the right side of the air outlet 12d. That is, the air inlet 12e is located opposite to the return chamber 20 with respect to the filter element 24.

Figure 4:
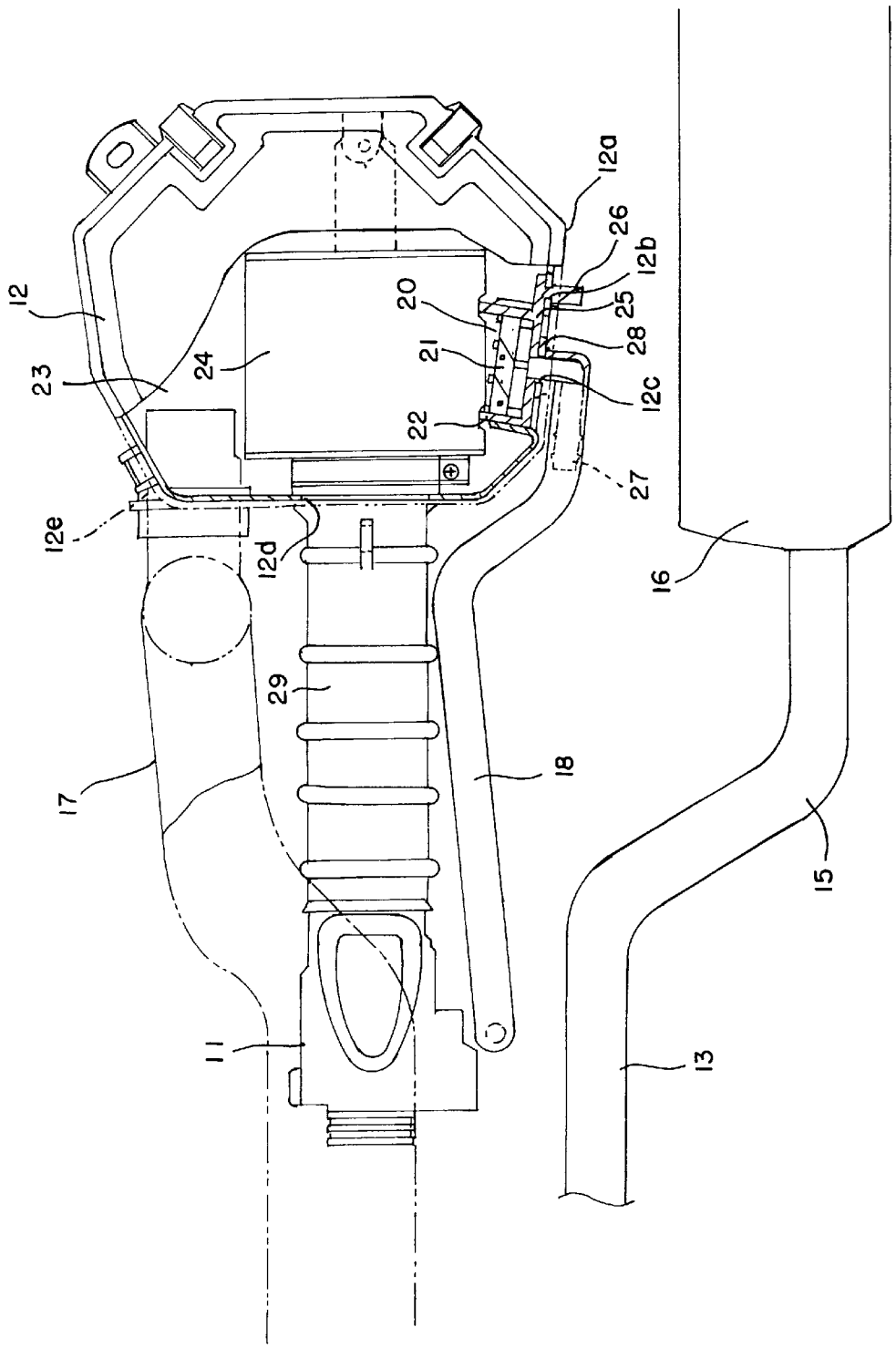
FIG. 4 is a partially cutaway plan view of the air cleaner and its associated parts shown in FIG. 3.

As is apparent from FIG. 4, the air cleaner 12 is located in the vicinity of the muffler 16, and the return chamber 20 is located in the vicinity of the muffler 16. Further, as is apparent from FIGS. 3 and 4, the exhaust pipe 13 overlaps a part of the induction pipe 18 as viewed in side elevation, and is located in the vicinity thereof. Accordingly, the return chamber 20 can be warmed by the heat radiated from the muffler 16, and the induction pipe 18 can be warmed by the heat radiated from the exhaust pipe 13.

Referring to FIG. 2, one of a pair of right and left upper frames 30 extends in the longitudinal direction. The muffler 16 is supported to a rear end portion of the left upper frame 30. A fuel tank 31 and a seat 32 are supported to the upper frames 30.

One of a pair of right and left lower frames 33 is provided for supporting the engine 4. Each lower frame 33 has a rear rising portion 34 connected to the corresponding upper frame 30 on the same side. A rear stay 35, shock absorber 36, handle post 37, handle bar 38, front axle 40, and rear axle 41 are operatively connected to respective upper frame 30 and lower frame 33.

The operation of this preferred embodiment will now be described. The blow-by gas generated in the crankcase 14 is induced through the induction pipe 18 into the return chamber 20 by an intake vacuum loathe air cleaner 12. In the return chamber 20, liquid components, foreign substances and the like mixed in the blow-by gas are removed by the return chamber filter 21. The blow-by gas thus filtered is next passed through the chamber filter element 24 to enter the clean area, and then supplied through the connecting tube 29 to the carburetor 11. In the carburetor 11, the blow-by gas is mixed with the fuel-air mixture, and next sucked into the cylinder portion 10 of the engine 4, in which the blow-by gas is burnt with the fuel-air mixture.

As is apparent from FIG. 4, the return chamber 20 is warmed by the heat radiated from the muffler 16 located in the vicinity of the return chamber 20. Accordingly, a low-temperature change which may hinder the flow of the blow-by gas hardly occurs in the return chamber 20 even in harsh low-temperature environments, so that good returnability of the blow-by gas can be maintained even in low-temperature environments.

Similarly, since the induction pipe 18 overlaps a part of the exhaust pipe 13, the induction pipe 18 is warmed by the heat radiated from the exhaust pipe 13, thereby obtaining a similar effect. Consequently, a blow-by gas treatment device which is excellent in low-temperature resistance as a whole can be obtained.

Furthermore, this blow-by gas treatment device can be configured simply by adjusting the layout of the air cleaner 12, the induction pipe 18, the exhaust pipe 13, and the muffler 16, all of which are similar to those in the prior art and without the need for providing any special heating devices or the like. Accordingly, the blow-by gas treatment device can be manufactured with a simple structure at a low cost.

In addition, since the blow-by gas treatment device of this preferred embodiment is applied to a riding type vehicle expected to be used in harsh low-temperature environments, the low-temperature resistance of this kind of vehicle can be improved. However, the riding type vehicle includes not only a buggy, but two-wheeled and three-wheeled automobiles, small-sized snowmobiles, etc. Broadly, the blow-by gas treatment device according to the present invention may be applied also to a general passenger car and other vehicles having cold-area specifications.

In modification, the exhaust pipe 13 may be provided along the substantially whole length of the induction pipe 18. However, it is sufficient to warm at least the return chamber 20 because the possibility of troubles at low temperatures is higher in the return chamber 20 having the return chamber filter 21 than in the induction pipe 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a riding type vehicle having an engine, an air cleaner connected to an intake portion of said engine, an induction pipe for inducing a blow-by gas from said engine to said air cleaner, and a muffler for receiving an exhaust gas from an exhaust portion of said engine; a blow-by gas treatment device for said engine the improvement comprising:

a return chamber for receiving said blow-by gas induced by said induction pipe, said return chamber being defined in said air cleaner; and said return chamber is positioned at a location disposed directly adjacent to said muffler.

2. In a riding type vehicle according to claim 1, and further including a return chamber filter for removing liquid components and foreign substances from the blow-by gas.

3. In a riding type vehicle according to claim 1, and further including an intake vacuum loathe air cleaner operatively connected to said return chamber for inducing blow-by gas through the induction pipe and into the return chamber.

4. In a riding type vehicle according to claim 3, and further including a chamber filter element in communication with said return chamber for cleaning the intake air and further cleaning the blow-by gas prior to supplying the intake air and the blow-by gas to a carburetor.

5. In a riding type vehicle according to claim 1, wherein the return chamber is warmed by heat supplied from the muffler.

6. In a riding type vehicle according to claim 1, wherein the induction pipe is positioned at a location disposed adjacent to the muffler and the induction pipe is warmed by heat supplied from the muffler.

7. A blow-by gas heating system for a riding type vehicle having an engine, an air cleaner connected to an intake portion of said engine, an induction pipe for inducing a blow-by gas from said engine to said air cleaner, and a muffler for receiving an exhaust gas from an exhaust portion of said engine comprising:

a return chamber for receiving said blow-by gas induced by said induction pipe, said return chamber being defined in said air cleaner; and said return chamber is positioned at a location disposed directly adjacent to said muffler.

8. The blow-by gas heating system according to claim 7, and further including a return chamber filter for removing liquid components and foreign substances from the blow-by gas.

9. The blow-by gas heating system according to claim 7, and further including an intake vacuum loathe air cleaner operatively connected to said return chamber for inducing blow-by gas through the induction pipe and into the return chamber.

10. The blow-by gas heating system according to claim 9, and further including a chamber filter element in communication with said return chamber for cleaning the intake air and further cleaning the blow-by gas prior to supplying the intake air and the blow-by gas to a carburetor.

11. The blow-by gas heating system according to claim 7, wherein the return chamber is warmed by heat supplied from the muffler.

12. The blow-by gas heating system according to claim 7, wherein the induction pipe is positioned at a location disposed adjacent to the muffler and the induction pipe is warmed by heat supplied from the muffler.

* * * * *